Patented Oct. 13, 1942

2,298,277

UNITED STATES PATENT OFFICE 2,298,277

COATED OR COLOR GRANULAR MATERIAL

Howard B. Burton, Jr., St. Paul, Minn., assignor to Minnesota Mining & Manufacturing Company, St. Paul, Minn., a corporation of Delaware No Drawing. Application April 1, 1939,
Serial No. 265,606

9 Claims. (Cl. 117—23)

The present invention relates to coated comminuted or granular material and methods of making the same. More particularly it has reference to coated or colored material of a type which may be used for weatherproofing or beautifying building materials and the like.

While in a broad aspect of this invention granules of various colors are contemplated, a particular and important aspect of this invention involves the production of granules having a good black color, although another aspect hereof involves applying other colors over black coated granules.

Prior to this invention no satisfactory commercial method was known for producing a black granule and no method was known which was economically feasible. Cobalt pigments heretofore known, even if a method were adapted for applying the same to granule coatings, were entirely too expensive to make their use suitable in the production of material which must be sold within the price range of roofing granules in order to have any commercial utility in this field.

A salient object of this invention is the production of a granule having or comprising a black coating. A further object of this invention is to attain a black coating economically. A further object of this invention is to produce coatings involving the reaction product of iron and chromium compounds and which are weatherproof in character. A further object is the production of coated granules in which a good bonding action is attained between the base granule and the color bearing coating. A further object is to attain coated granules having a relatively permanent, non-fading coating when exposed to weathering. A still further object is the provision of a uniformly coated granular material, especially a black colored coated granule, which does not give the effect of "shading" under conditions of light and exposure. These and other objects and advantages will appear from the description taken as a whole in connection with the appended claims.

A preferred aspect of this invention involves applying a coating containing sodium dichromate and ferrous sulfate, or their equivalents, or a reaction product thereof, and a suitable reducing agent, together with suitable glaze forming ingredients in proper proportions to provide a "balanced" glaze to the surfaces of the granules. The mere reacting of sodium dichromate and ferrous sulfate, or their equivalents, without regard to the atmosphere in which they are reacted, is not sufficient to provide the desired black coating of this invention. It is necessary to have strongly reducing conditions and such reducing conditions may advantageously be provided by the use of a reducing agent, such for example as powdered bituminous coal, disseminated with the coating ingredients. This provides a strong reducing action at the high tempertaures employed during the coating operation. Bituminous coal, anthracite coal, coke, or mixtures thereof or containing the same, when used in sufficient amount, will not be completely dissipated until the coating operation is complete; in fact, it is customary and preferred to use a sufficient amount of powdered bituminous coal, or equivalent reducing agent, so that there will be a slight excess of powdered coal or equivalent in the final granule coating.

Another ingredient, while not at all essential to the production of the black color but which may be employed to advantage as a part of the glazing ingredients of the coating, is a boron compound, especially oxygen-containing compounds of boron, boric acid being a preferred illustration, although borax and other borates are contemplated. The boric acid or equivalent has the property of providing desired fluidity to the coating compositions in the carrying out of preferred processes of applying the same to the surfaces of the base granules and accordingly assists in attaining a thin, even coating on the granules and one which has good adherence to the base granules.

Another important aspect of the present invention is that granules having a black coating of the type herein defined, although they are particularly intended to be used as a finished commercial granule in roofing material, artificial stone and the like, may serve as the base for other colored coatings and thus aid in the production of suitable granules of various other colors. Where a translucent base granule such as quartz or quartzite are employed, difficulty is encountered with certain colors in securing suitable opacity of the finished granule or of the coating thereof. It has been found that where coated granules are employed as a weatherproofing or beautifying material, for example in roofing material having asphalt or other adhesive or bituminous material as a binder, that such adhesive materials or bonding agents, especially asphalts, are usually quite photo-sensitive in character and, if the granules permit the passage of any substantial proportion of light, especially light within the ultra-violet range, the asphalt will be deteriorated at the interface between the asphalt and the granule and will result in the granules becoming loosened, which may result in granule loss from the roofing element or the like.

It is desired that granules employed in roofing material be suitably opaque in character (the opacity being provided by the coating where a translucent granule, such as quartz, quartzite, etc., is employed) so that not more than 1.5 or 1.0 percent, and preferably not more than 0.5 percent, or less, of the incident light within the wave length range of 2900 to 4700 Angstrom units, as measured by means of photographic registration, will pass through the coated granules. The black coating of the present invention will provide the desired opacity to granules of a translucent character, whether it is desired that the granules to be sold be black or have some other color applied thereover. In fact the coating compositions of this invention can be readily employed to reduce the transmission of incident light within the ultra-violet range to less than 0.25 of 1 percent.

The photographic registration or test just referred to is the only known method of making such measurements and is a test developed in the laboratories of Minnesota Mining & Manufacturing Company and now employed by others in this art. In carrying out this test granules are placed in a single layer on a photographic plate or film and are exposed to light of the band or range chosen, e. g. approximately 2900 to 4700 Angstrom units. The degree of blackening of the photographic material, as shown upon development of the film or plate, constitutes the measurement of the percent of incident light which is allowed to pass or is transmitted by the granules.

The coated granules of this invention may be incorporated as a coating for roofing shingles or other roofing material, as above indicated, or may be employed as an aggregate in artificial stone such as cast stone, cement and the like. While the base granule which I employ may be selected from any of a number of materials which are sufficiently refractory in character to stand the high temperatures normally employed during my coating operation, I preferably employ substances of a mineral, siliceous or like nature, whether natural or artificial, preferred examples being quartz, quartzite, novaculite and certain suitably refractory igneous rocks. Also many feldspars can be used and certain slate materials as well as certain rocks of the nature of such granite as that which is composed primarily of quartz and feldspar compounds. The base granules employed may be of any suitable size, an exemplary size being such that the granules will pass a "10-mesh" screen and be retained on a "35-mesh" screen. It will of course be understood that the invention is not limited as to granule size but contemplates the treatment of granule or comminuted material generally and of varying size. However, in the examples given hereinafter, granules of this general order of size are contemplated and where larger size granules are employed less coating material would be required per ton of granules to give a coating of the same thickness, while if granules of smaller size were employed, a greater quantity of coating material would be required per ton of granules for the same thickness of coating, depending upon the change in aggregate surface area of the granules per unit weight.

In order to specifically illustrate the invention, but not to limit the same, reference will be made to the following coating compositions:

*Formula 1*

| | Pounds |
|---|---|
| Granules (e. g. quartz or quartzite) | 2000 |
| Ferrous sulfate | 70 |
| Sodium dichromate | 18 |
| Boric acid | 9 |
| Sodium silicate | 5 |
| Soda ash | 4 |
| Water | 10 |
| Bituminous coal | 70 |

*Formula 2*

| | Pounds |
|---|---|
| Granules | 2000 |
| Ferrous sulfate | 70 |
| Sodium dichromate | 22 |
| Boric acid | 5 |
| Water | 10 |
| Coal | 70 |

*Formula 3*

| | Pounds |
|---|---|
| Granules | 2000 |
| Ferrous sulfate | 60 |
| Sodium dichromate | 40 |
| Boric acid | 8 |
| Coal | 60 |

As an illustration of a suitable method of applying the coating composition of any of the above formulae to the surfaces of the base granules, the coating ingredients and the granules may be mixed together by any suitable means, for example in a mixer of the type of an ordinary concrete mixer. The granules having the coating ingredients adhering to the surfaces thereof may then be fed into a standard rotary kiln, through which the granules progress from one end to the other. This kiln is heated to a high temperature and, as the granules pass through the kiln, they are both heated and agitated. In the hottest portion of the kiln the temperature is advantageously held within the range of 1600° or 1650° F. to 2300° F., or of that order, the preferred maximum temperature being within the range of 1800° to 2100° F. or from 1850° to 2000° F. The kiln is ordinarily rotated quite slowly; e. g. 1 or 4 R. P. M., and may be tilted so that the progress of the granules from end to end of the kiln will take approximately 40 minutes. The granules will remain within the maximum temperature range above indicated for from about 2 to 10 minutes. In this heating or firing operation in the kiln, over-heating or direct impinging of the flame on the granules should be avoided in order to obviate the possibility of improper coloring or non-uniformity of the coatings.

While prior to the introduction of the granules into the rotary kiln for firing, the particular method of getting an adhering coating of the reacting ingredients on the surfaces of the granules is optional, one suitable and contemplated method is as follows: The granules, for example quartz or quartzite of suitable size may be introduced into a mixer, such as an ordinary concrete mixer. The sodium dichromate dissolved in the water may then be introduced into the mixer and agitated with the granules to wet the surfaces of the same and so that the dichromate solution is uniformly distributed thereover. Next all of the remainder of the dry chemicals, including the powdered coal, may be mixed together and introduced into the mixer, the mixing being continued until the mixture of dry chemicals is substantially uniformly distributed over the wet surfaces of the granules. The resulting granules are then ready to be introduced into the rotary kiln, or equivalent, for firing. In preferred practice, there is customarily a slight excess of the carbonaceous reducing agent remaining at the end of the firing operation, i. e. when the granules leave the kiln, although this is not an absolute requirement of the present invention.

A strong reducing atmosphere within the mass of granules during the firing operation is very important in the present invention and the best economical way of securing a strong reducing atmosphere which I have found is to have coal and/or coke or equivalent, in finely divided state, disseminated throughout or mixed with the batch of granules. While the amounts of reducing agents above illustrated are not critical, if too much reducing agent, such as coal, is employed, this results in a weakening of the coating; whereas, if too little reducing agent is employed, the result is that reoxidation of the coating ingredients occurs and also discoloration is caused. Additionally, the insolubility and weatherproofness of the coating is enhanced by the use of a reducing agent, such as coal, in amounts of the general order illustrated, or at least not greatly in excess thereof, so as to insure the reduction of any excess soluble chromates.

As stated, it is desired that there be a slight trace of the reducing agent present in the glaze or coating on the granules after they emerge from the kiln and are cooled down. To determine, after cooling of the granules, whether they have been properly coated, any deviation of color from a desired ceramic black, i. e. the production of a coating not sufficiently black, where other preferred conditions are employed, will indicate that not enough reducing agent was employed; possibly that the reducing agent was substantially completely exhausted before the end of the heating cycle. On the other hand, if the coating on the granules is of a good black color but is of such character that, when the granules are subjected to the standard steam leach test (boiled for 24 hours in water), the latter lose their color to substantial extent or show a lack of the desired waterproofness, this indicates that too much reducing agent has been employed.

The above formulae are similar in certain respects. Each of them shows the use of ferrous sulfate and sodium dichromate which, when reacted together in a strong reducing atmosphere, as furnished by powdered coal, coke or mixtures thereof disseminated throughout the mass or batch of granules, provide the desired black pigmentation or coloring for the granule coatings. In addition to these ingredients and the base granules themselves, which latter may be for example quartz, quartzite, novaculite or other suitably refractory material, it will be noted that the only additional ingredient present in Formula 3 is boric acid and in Formula 2 boric acid and water. The boric acid may be viewed as primarily a glaze-forming constituent, although it also aids in the processing of the granules and facilitates the production of a good black colored granule coating.

In Formula 1, in addition to boric acid, sodium silicate and soda ash ($Na_2CO_3$) are also included and, along with the boric acid and $Na_2O$ from the sodium dichromate which is released during the heating operation, form the glazing constituent of the black coating. The dry powdered sodium silicate of Formula 1 may have a soda ($Na_2O$) to silica ($SiO_2$) ratio of, for example, 1 to 3.25 although of course sodium silicates having other ratios of soda to silica are contemplated.

Of the three formulae above mentioned, Formula 1 and Formula 2 are preferred over Formula 3. The latter does not include any water and for that reason is not as convenient to process as are the other formulae, and also is expensive due to the relatively high proportion of dichromate. Formula 1 is especially preferred and provides a good "balanced," weather-resistant coating. However, Formula 2 is likewise commercially satisfactory and one or the other of these formulae, or intermediate modifications thereof, may be employed depending upon the relative cost of the different ingredients.

A "balanced," weatherproof coating is mentioned above. I have found that to secure a good weatherproof commercial product a certain balance or relationship between different ingredients of the glaze-forming or bond-forming constituents must be maintained. For example, where boric acid or other boron compound is employed and $Na_2O$ (from the sodium dichromate and/or from sodium silicate or sodium carbonate) is present, the molecular ratio of the boron compound to the soda should be within certain limits. Figuring the boron compound on the basis of $B_2O_3$ and the soda on the basis of $Na_2O$ as such, on a mol basis the $B_2O_3$ should be present to the extent of at least approximately 0.3 of that of the $Na_2O$ but should not be present to a greater extent than approximately 0.6 that of the $Na_2O$. Of course specific preferred relationships between boron-containing components and soda are illustrated in the above formulae.

While boric acid, borax or other boron compound, especially water-soluble boron compounds, are desired in the production of a black granule, as illustrated by the above formulae, a boron compound is not essential to the production of a good black colored coating and formulae which will give a coating of desired black color without the use of boron compounds are as follows:

Formula 4

| | Pounds |
|---|---|
| Granules (quartzite etc.) | 2000 |
| Ferrous sulfate | 80 |
| Sodium dichromate | 20 |
| Powdered bituminous coal | 60 |
| Dry powdered sodium silicate | 20 |

Formula 5

| | Pounds |
|---|---|
| Granules | 2000 |
| Ferrous sulfate | 80 |
| Sodium dichromate | 20 |
| Soda ash ($Na_2CO_3$) | 10 |
| Calcium carbonate | 10 |
| Litharge (PbO) | 15 |
| Powdered bituminous coal | 60 |

While Formulae 4 and 5 do not provide as weather-proof or weather-resistant coatings as provided by Formulae 1, 2 and 3, for example, nevertheless they do provide granules having a coating of a good black color.

These granules may be employed as such or may be used in carrying out that aspect of my invention which involves using black colored granules as a base for other colors which are applied over the ceramic black, Formula 4 being preferred over Formula 5. For example, in the roofing industry light colored or translucent granules, when coated with certain colored coatings, often have a weak or washed out appearance. However, when such colors are applied over black ceramic coated granules as herein defined, preferably produced according to Formula 1 or Formula 2 hereof, their appearance and color effect is greatly enhanced and improved and the use of the granule as a weatherproofing coating on roofing or other material, e. g. asphaltic roofing, is much improved. A conspicuous illustration is in connection with various blue colors, although this aspect of my invention is not so limited and any color may be applied over my ceramic or black coated granules.

An example of a blue coating which may be applied over the black coated granules of this invention is as follows:

Formula 6

| | Pounds |
|---|---|
| Cobalt blue stain | 30 |
| Kaolin | 20 |
| Cryolite | 4 |
| Sodium silicate solution (sp. gr. 1.4) | 104 |
| Water | 40 |

Granules containing this coating composition may be fired at temperatures of the order of 1050° F. to provide a good blue granule. However, inasmuch as my black coated granules are very refractory in character, it is readily possible to employ higher temperatures in providing the second coating without running into difficulties and without injuring the black coating so long as temperatures are employed which are below the fusion temperature of either coating. For example temperatures of the order of 1250° F. on up to 1400° F., or even somewhat higher, may be safely employed, so long as this is below the fusion temperature of either coating. Apparently no interfusion between the black coating and the top coating, e. g. the blue coating, takes place under these temperature conditions. The lighter blue color is deepened and made richer by the black undercoat. Furthermore, the opacity of the finished granule is improved by virtue of the black undercoat.

Another coating which may be applied over any of my ceramic black coated granules above illustrated is as follows:

Formula 7

| | Pounds |
|---|---|
| Ultramarine blue (pigment) | 26 |
| Kaolin | 16 |
| Cryolite | 4 |
| Sodium silicate solution (sp. gr. 1.4) | 72 |
| Water | 4 |

In the formula last given the sodium silicate employed had a ratio of $Na_2O$ to $SiO_2$ of 1 to 3.22. The formula is intended for one ton of base granules before the black coating is applied.

In addition to Formulae 1 to 5, the following formula may also be employed to produce a black colored granule, particularly where another and different colored coating, such as those illustrated by Formulae 6 and 7, is to be applied thereover.

Formula 8

| | Pounds |
|---|---|
| Quartzite granules | 2000 |
| Ferrous sulfate | 72 |
| Sodium dichromate | 16 |
| Boric acid | 10 |
| Powdered coal | 40 |

While the coating ingredients of Formula 8 are not as weatherproof as those of other formulae, e. g. Formulae 1 or 2, and hence would not provide weather-resistance of the order of that of the coatings of the last-mentioned formulae, for example, nevertheless, the ceramic black coating of Formula 8 may be used, particularly where covered with a second and different colored coating, which latter is exposed to the weather. A temperature of the order of 1750° F. to 1900° F., for example, may be employed in applying the coating composition of Formula 8 and a rotary kiln or equivalent, of course, may be used in carrying out the coating process.

While Formulae 6 and 7 illustrate blue coatings which may be applied over the ceramic or black coated granules of this invention and may have their color effects enhanced thereby, other colored coatings which may also advantageously be applied over my black coated granules are violet colored coatings and indigo colored granules, for example.

While the especially contemplated reactants for the production of the black colored product or pigment of my coating composition, in addition to the powdered coal or equivalent, as illustrated in the above formulae, are ferrous sulfate and sodium dichromate, these materials are not essentials and each of them may be replaced by other ingredients which will function in generally similar manner to produce a black coated granule, though for economic and processing reasons ferrous sulfate and sodium dichromate seem to be the best choice of materials, at least at the present time.

As substitutes for ferrous sulfate other iron compounds, especially other iron salts, which are water-soluble and/or which are reactive with the chrome compound at temperatures employed are suitable, other examples being ferric sulfate, ferric chloride, ferrous chloride, etc.

As substitutes for sodium dichromate other chrome compounds which are reactive under the temperature conditions employed, e. g. other chromium salts, especially other water-soluble chromium salts, may be employed and such substitutes include sodium chromate, potassium dichromate, chromic acid and even other chrome compounds such as chromium sulfate or basic chromium sulfate. While chromium sulfate is not substantially reactive with ferrous sulfate in water solution, nevertheless it reacts satisfactorily with ferrous sulfate under the temperature conditions employed in coating, e. g. when the granules are passed through the rotary kiln or equivalent.

Where potassium dichromate is substituted for sodium dichromate, it may be substituted mol for mol. However if sodium chromate is substituted in place of sodium dichromate, then double the molecular proportion of sodium chromate would be required to provide an equivalent chrome content and this would increase the $Na_2O$ content of the coating which would have to be compensated for by the introduction of less soda into the coating from such ingredients as sodium silicate and soda ash and/or by the use of a higher amount of such component as boric acid in order to secure a finished coating having the desired high degree of weatherproofness which the present invention contemplates.

This same reasoning applies with respect to substitutes for ferrous sulfate. Substitution should be made in such molecular portions so as to introduce an equivalent amount of iron if comparable results are to be attained.

Boric acid is a preferred constituent of the glaze composition of the ceramic black coating of the present invention, as illustrated, for example, in Formulae 1 and 2 above. In addition to aiding in the processing of the granules and avoiding sticking together of the same at high temperatures, the boric acid seems to catalyze or otherwise aid in promoting those reactions or selective reactions between ferrous sulfate and sodium dichromate which lead to a black colored granule instead of a brown or some other color. Boric acid also makes it possible to produce a "balanced" glaze very economically. However the functions of the boric acid can be provided to substantial extent by other boron compounds, for example borax. However when borax ($Na_2B_4O_7$)

is employed, as will be readily seen, this introduces $Na_2O$ into the coating and would render desirable a corresponding reduction of the amount of $Na_2O$ introduced into the coating composition by soda ash, sodium silicate and/or sodium dichromate.

As a matter of fact, as above pointed out, boron compounds need not be used at all in producing the ceramic black coating of this invention, other glaze-forming or bond-forming components having ingredients present in suitable proportions to provide a desired "balanced" glaze being likewise contemplated. However, as above indicated, a boron compound, e. g. boric acid, though not an essential, is nevertheless a preferred ingredient of my coating compositions.

While powdered bituminous coal is a preferred reducing agent to employ in my formulae for the production of a black coating, it will be understood that other carbonaceous materials such as hard coal, coke, mixtures of the same, or mixtures of any or all of these materials with other suitable reducing agents, may be employed and are contemplated. The important thing is to employ a reducing agent which contains constituents which will last throughout the entire heating cycle and hence will provide a reducing action near the end of the heating cycle as well as at earlier stages of the same. In fact it is undoubtedly more important to maintain a highly reducing atmosphere toward the end of the heating cycle than near the beginning and, although I customarily add my reducing agent, e. g. powdered coal, to the granules before they are admitted into the rotary kiln, some or all of the reducing agent may permissibly be added at a later time. The reducing agent such as coal appears to provide its reducing action by the formation of carbon monoxide within and all throughout the batch or aggregate of granules and this gas probably is the material which really functions in providing the reducing effect; however this is merely a statement of theory.

While substitutes for various of the preferred ingredients of the coating composition of this invention as illustrated for example in Formulae 1, 2 and 3 have been hereinabove discussed and also illustrative variations in the proportions of such ingredients or their equivalents have been above described, contemplated variations in proportions by weight may be further illustrated or made more clear by reference to one illustrative formula. Formula 1 may be selected for the sake of a specific choice. In such a formula, while keeping the remainder of the ingredients constant as shown, the amount of ferrous sulfate employed, which is therein illustrated as 70 lbs., may be varied, for example, within the range of about 60 lbs. to 85 lbs. Again, while keeping the remainder of the ingredients constant the amount of sodium dichromate, although illustrated as 18 lbs., may be varied from a minimum of about 12 lbs. up to 30 lbs., more or less. The boric acid, sodium silicate and soda ash, which go to form the glaze of the coating or binder for the pigment, may be varied within considerable ranges but these ingredients plus the sodium dichromate should be present to an extent by weight of at least about one-third of the weight of the ferrous sulfate and are preferably present to an extent by weight of at least about one-half that of the ferrous sulfate. The soda ash may be varied, for example, from about 8 lbs. or so down to zero. Also the sodium silicate may be varied from about 10 lbs., more or less, down to zero. Where the sodium silicate and soda ash are reduced to the point where they are completely eliminated or substantially completely eliminated, it will be noted that the same constituents would then remain as are shown in Formula 2 hereof. The proportions of boric acid may also be varied within substantial limits. Keeping the remainder of the constituents constant the weight of boric acid employed may be varied between about 6 lbs. and 15 lbs. or so. It will be understood that if the sodium dichromate of Formula 1 is increased, while the ferrous sulfate, sodium silicate and soda ash are kept constant, it would be necessary to increase the boric acid content in order to maintain a similarly "balanced," waterproof glaze. If the ingredients of Formula 1 are varied, it should be observed that the proportions are preferably controlled so that the amount of boric acid, figured on the basis of $B_2O_3$ will have a mol relationship to the $Na_2O$ content of the coating within the range of 0.3 to 0.6, or thereabouts. A mol ratio of $B_2O_3$ to $Na_2O$ of the order of 0.4 or 0.5 ordinarily being very satisfactory.

Where a coating process as herein described is employed, powdered bituminous coal, or equivalent, should be present to an extent by weight of at least about two-thirds that of the ferrous sulfate and is usually present in about the same weight as the ferrous sulfate. For example, in Formula 1, keeping the other ingredients constant as shown, the weight of coal might vary from about 45 lbs. to 80 lbs., or so.

While I have herein illustrated my invention in various particulars and have pointed out illustrative modifications thereof, it will be understood that I do not intend to be limited thereby but contemplate all variations and modifications within the scope of this application and within the scope of the appended claims.

What I claim is:

1. As a new article of manufacture granules adapted for use as roofing granules or the like having on the exterior an adherent coating produced by reacting at temperatures in excess of about 1600° F. in situ on surfaces of the granules a mixture of coating ingredients comprising sodium dichromate, ferrous sulfate, boric acid and powdered bituminous coal, said sodium dichromate being present to a lesser extent by weight than one-half that of said ferrous sulfate, said powdered coal being present to the extent by weight of at least about two-thirds that of said ferrous sulfate, and said boric acid being present to an extent by weight such that when figured on a mol basis and on the basis of $B_2O_3$, the said $B_2O_3$ will be present to the extent of at least 0.3 but not to a greater extent than 0.6 of that of the $Na_2O$ content of said coating, the latter also being figured on a mol basis.

2. A new article of manufacture as defined in claim 1 further characterized in that said article additionally comprises an outside coat in the color range of blue, indigo and violet, firmly adhering to the coating defined in claim 1.

3. As a new article of manufacture, a building sheet having a bituminous binder and having a surface coating of granules of the character defined in claim 1.

4. The method of producing black colored granules, adapted for use as roofing granules or the like, which comprises coating suitably refractory base granules with a mixture of coating ingredients comprising ferrous sulphate, sodium dichromate, boric acid and a reducing agent comprising powdered bituminous coal, the said boric acid being present to an extent by weight such that, when figured on a mol basis and on the basis of $B_2O_3$, the said $B_2O_3$ will be present to the extent of at least 0.3 but not to a greater extent than 0.6 of that of the $Na_2O$ content of the said coating, the latter also being figured on a mol basis; gradually heating the resulting coated granules, while agitating the same, to a maximum temperature within the range of 1650° to 2300° F., and then gradually cooling the same, a sufficient amount of said reducing agent being employed so that there is a slight trace of the same in the coating of the finished granules after the same have cooled down.

5. As a new article of manufacture, granules adapted for use as roofing granules or the like having on the exterior an adherent coating produced by reacting at temperatures in excess of about 1600° F. in situ on surfaces of the granules a mixture of coating ingredients comprising sodium dichromate, a water-soluble di-valent metal salt including an iron salt, a water-soluble borate and a finely divided solid carbonaceous reducing agent including material from the class consisting of coal and coke, said dichromate being present in substantial proportion but to a lesser extent by weight than said di-valent metal salt, said finely divided carbonaceous reducing agent being present to greater extent by weight than said dichromate, and said borate being present to an extent by weight such that, when figured on a mol basis and on the basis of $B_2O_3$, the said $B_2O_3$ will be present to the extent of at least 0.3 but not to a greater extent than 0.6 of that of the $Na_2O$ content of said coating, the latter also being figured on a mol basis, said coating being weather-resisting in character and substantially free of water-soluble salts.

6. An article as defined in claim 5 further characterized in that the coatings on said granules are glazed ceramic coatings produced by interaction of the named ingredients of said mixture of coating ingredients at temperatures in the range of 2000 to 2300° F.

7. As a new article of manufacture, roofing granules of the class described having on the exterior of refractory base granules an adherent glazed coating prepared in situ on surfaces of the granules from a vitrifiable coating composition comprising a water-soluble chromate, a di-valent metal salt including an iron salt, a water-soluble borate and a powdered carbonaceous reducing agent from the group consisting of coal and coke, said chromate being present to a lesser extent than said di-valent metal salt, said powdered reducing agent being present to at least as great an extent by weight as said chromate, and said borate being present to an extent by weight such that, when figured on a mol basis and on the basis of $B_2O_3$, the said $B_2O_3$ will be present to the extent of at least 0.3 but not to a greater extent than 0.6 of that of the $Na_2O$ content of said coating, the latter also being figured on a mol basis, said coating being weather-resisting in character and substantially free of water-soluble salts.

8. As a new article of manufacture, a building sheet having a bituminous binder and a surface coating of granules of the character defined in claim 5.

9. As a new article of manufacture, a building sheet having a bituminous binder and a surface coating of granules of the character defined in claim 7.

HOWARD B. BURTON, Jr.